United States Patent [19]

Dimock et al.

[11] Patent Number: 5,571,427
[45] Date of Patent: Nov. 5, 1996

[54] TORCH HEAD AND CABLE ASSEMBLY FOR A WELDING DEVICE

[75] Inventors: John Dimock, Houston, Tex.; James Watson, St. Charles, Ill.

[73] Assignee: Weldcraft Products, Inc., Burbank, Calif.

[21] Appl. No.: 415,368

[22] Filed: Apr. 3, 1995

[51] Int. Cl.⁶ .................................................. B23K 9/167
[52] U.S. Cl. ........................... 219/75; 219/136; 219/137.9
[58] Field of Search ....................... 219/75, 136, 137.62, 219/137.63, 137.9, 138, 144; 174/15.6

[56] References Cited

U.S. PATENT DOCUMENTS

| | | | |
|---|---|---|---|
| 2,376,943 | 5/1945 | Smith | 219/144 |
| 2,512,707 | 6/1950 | Anderson | 219/75 |
| 3,098,892 | 7/1963 | Spade et al. | 219/136 |
| 3,968,341 | 7/1976 | Manning | 219/136 |
| 4,145,595 | 3/1979 | Keller et al. | 219/137.9 |
| 4,788,401 | 11/1988 | Kleppen | 219/75 |
| 4,853,516 | 8/1989 | Julien et al. | 219/137.9 |
| 5,378,870 | 1/1995 | Krupnicki | 219/136 |
| 5,403,987 | 4/1995 | Rehrig | 219/75 |

Primary Examiner—Clifford C. Shaw
Attorney, Agent, or Firm—Brinks Hofer Gilson & Lione

[57] ABSTRACT

An torch head and cable assembly is disclosed having improved electrical insulation, an anti-rotational, space-efficient handle and a more efficient power cable. The torch head has a seal using inner and outer sealing walls to insulate an operator from high frequency electric energy. A handle and handle connector on the torch head have complementary polarized cross-sections to form an anti-rotational connection. The cross-section on the handle minimizes wasted space around cables positioned inside the handle and cooperates with a power cable having at least two wires to supply electric current to the torch head in an efficient manner.

25 Claims, 4 Drawing Sheets

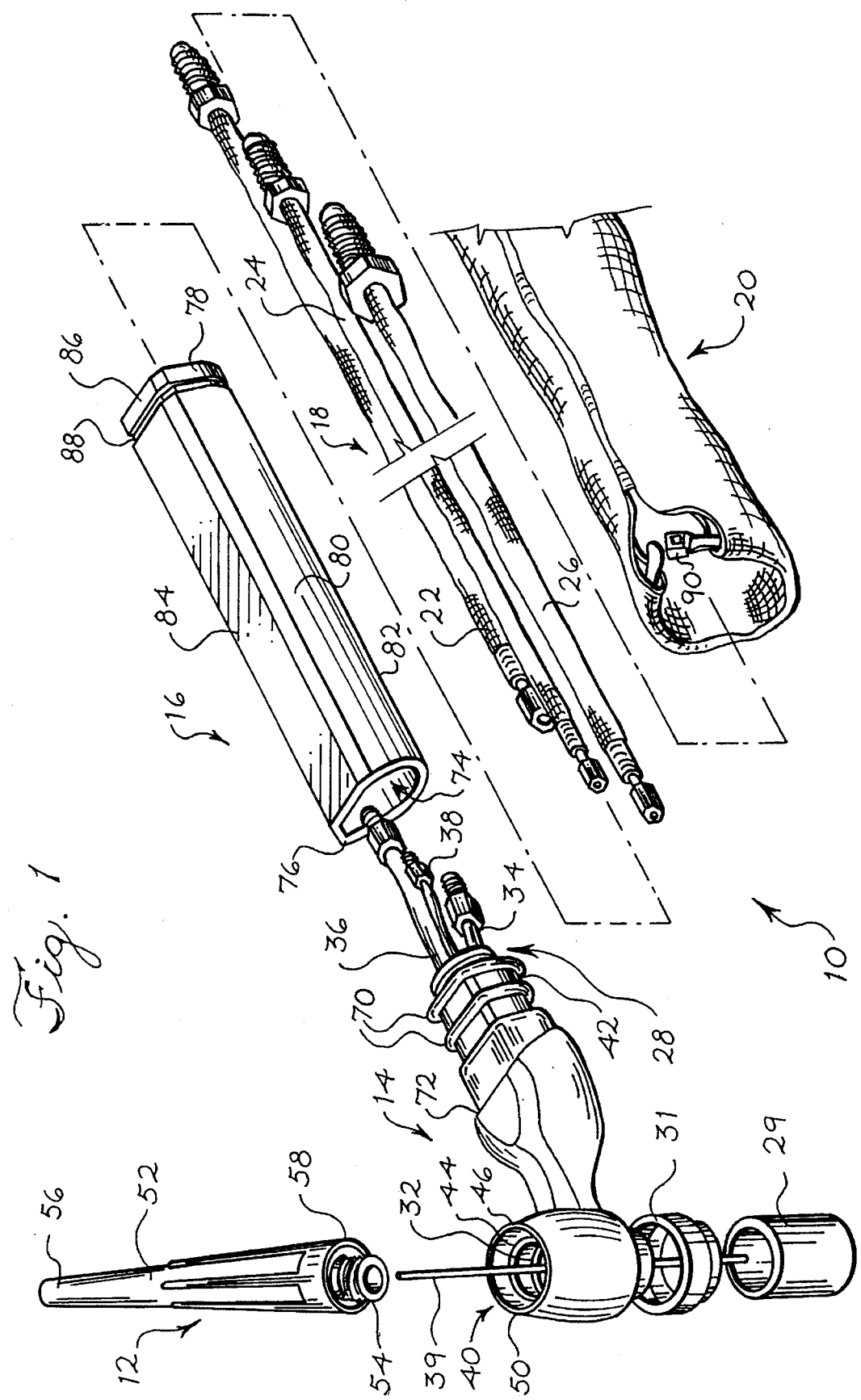

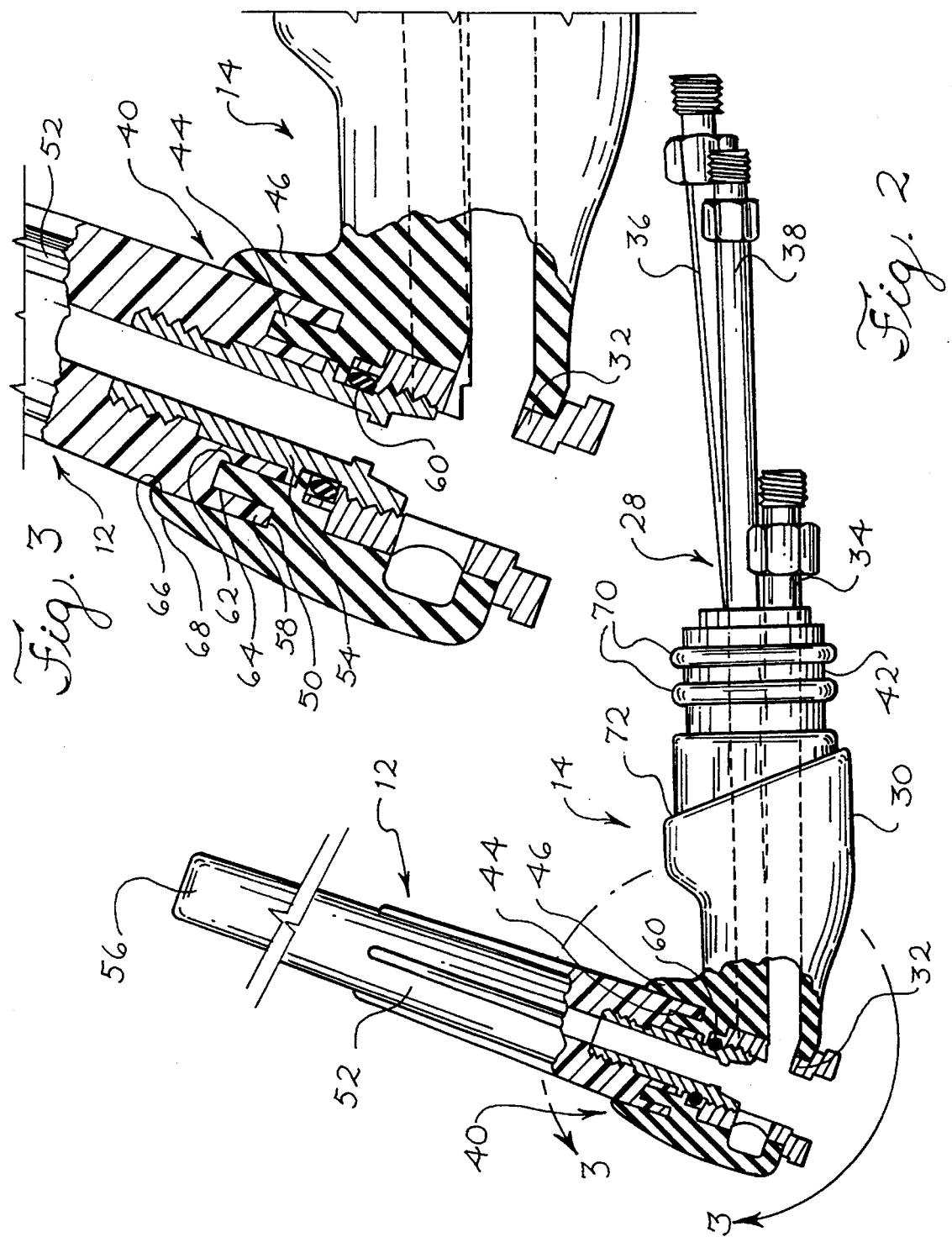

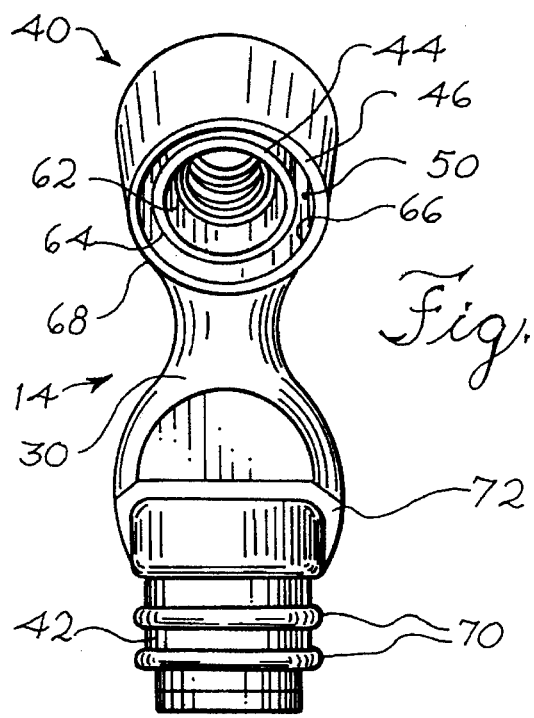
Fig. 4
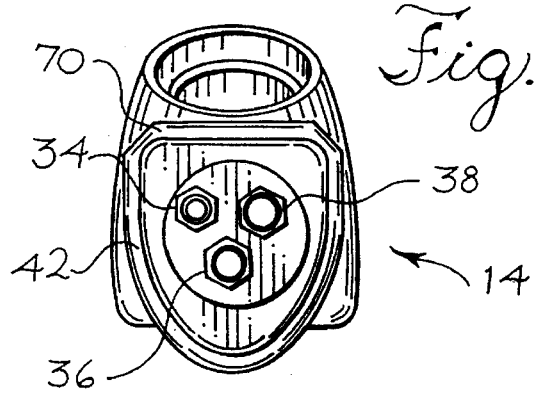
Fig. 5
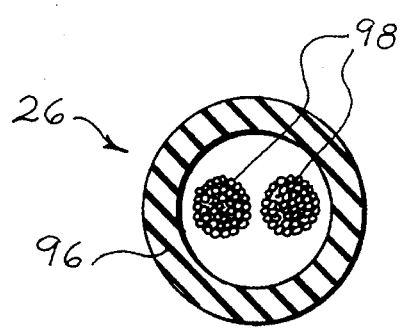
Fig. 10
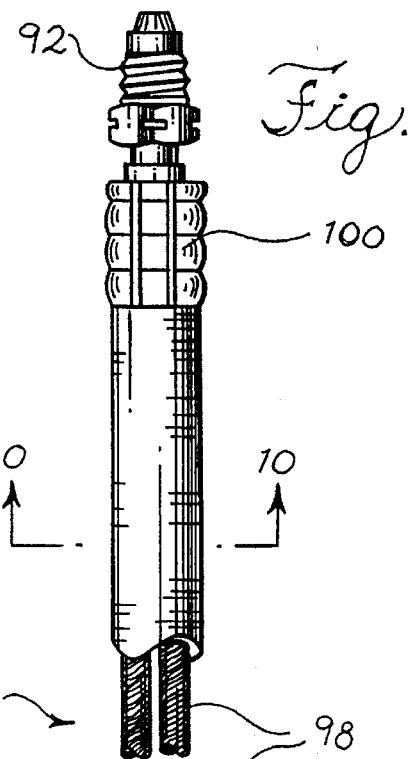
Fig. 9
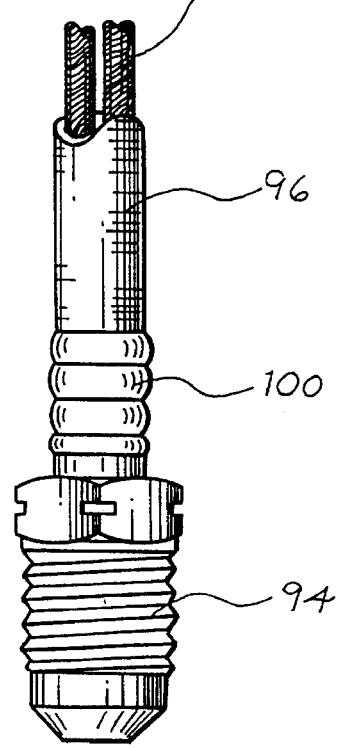

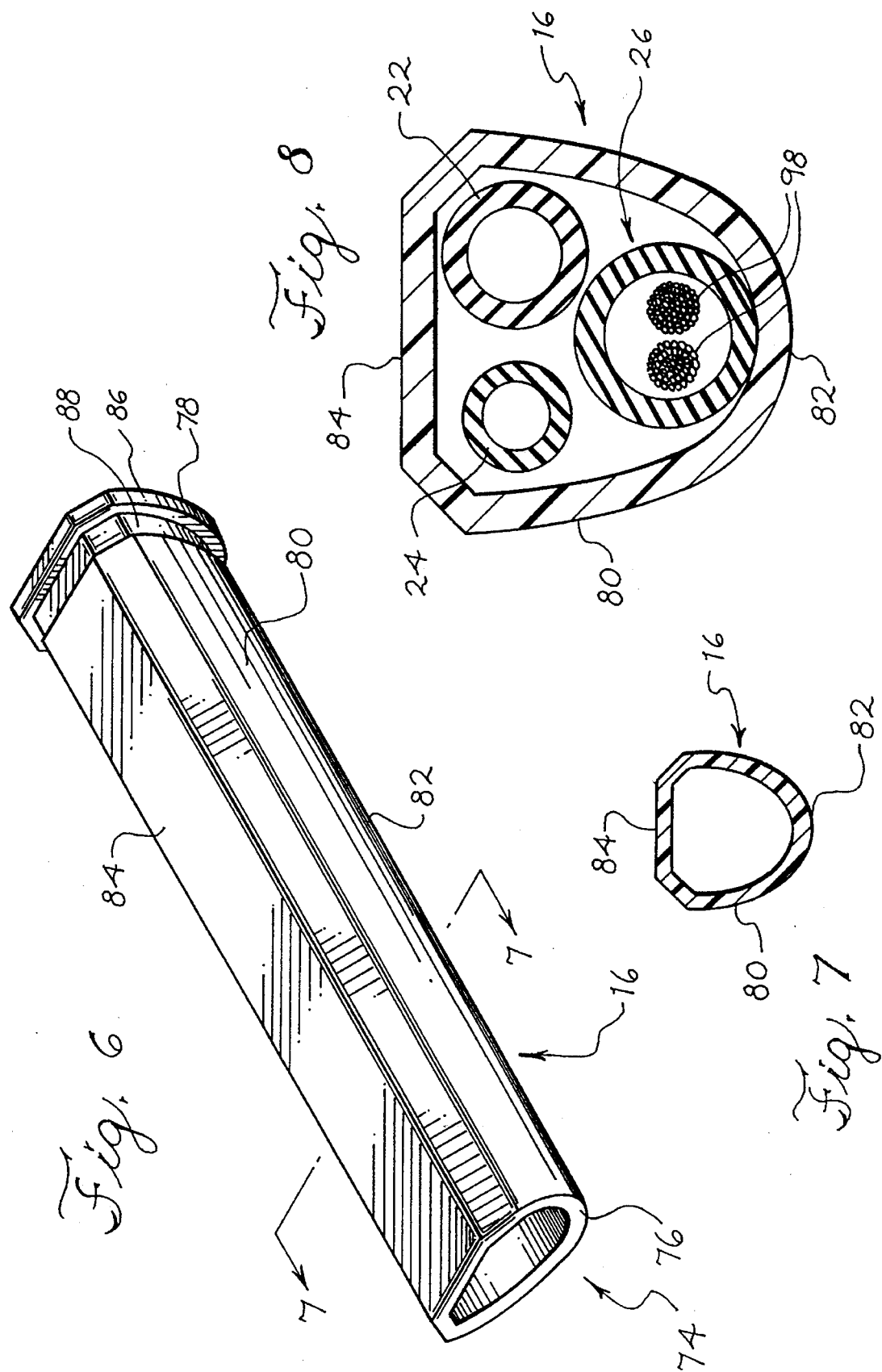

TORCH HEAD AND CABLE ASSEMBLY FOR A WELDING DEVICE

BACKGROUND OF THE INVENTION

Welding torch devices are commonly used to connect metals together in manufacturing and in construction activities. One particular type of welding device is a gas tungsten arc welding (GTAW) torch, commonly referred to as a tungsten inert gas (TIG) arc welding torch. The TIG torch uses a tungsten electrode and an ionized inert gas to form an electric arc to the desired work surface. As with arc welding devices generally, large amounts of electric current are required to operate a TIG welding device. For safety and efficiency reasons it is desirable to insulate the operator of a welding torch from the welding current and the high frequency electrical energy utilized in the welding device.

Present torch head assemblies for TIG welding devices typically have a back cap that connects to a torch head. The back cap contains an electrode and connects to the torch head. The rear portion of the electrode extends from the torch body into the hollow body of the back cap. In operation, an inert gas is fed into the torch head and guided through a nozzle around the front portion of the electrode to the work surface. High frequency signals are superimposed onto the power supply providing electric current to the electrode in order to ionize the gas and create an electrical arc from the electrode to the work surface. The connection between the torch head and the back cap is important in that a poor seal will allow gas and high frequency electrical energy to leak out. Present seals on TIG torches only use a single sealing surface between the torch head and back cap to address this problem. Therefore, it would be advantageous to have better seal to protect an operator from the gas and electrical energy.

The high amounts of current used in the TIG process leads to high amounts of heat being generated at the electrode and in the power cable supplying the electricity to the electrode. The electrical rating of the torch head and cable assembly depends upon the amount of electric current the cable can safely carry without overheating. A power cable that is more efficient in dissipating heat can carry more current. Many power cables used in welding are bulky and not very flexible. A power cable possessing greater heat dissipation efficiency and flexibility is desirable.

As a result of the need for large power cables, larger handles must be attached to the torch head assembly to accommodate the larger cables. The larger handles can be difficult for an operator to grip. Also, various types of currently available TIG torch handles attach to the torch head using circular, friction-fit mating surfaces. In operation, undesired rotation may occur between the torch head and the handle. TIG torch handles using threaded surfaces to connect to the torch head also suffer from unwanted rotation due to the thermal expansion and contractions caused by the heat generated in operating the welding device. It would be advantageous to have a smaller handle that is easier to grip and that will form a connection with the torch head that will not rotate.

SUMMARY OF THE INVENTION

The present invention relates to an improved torch head and cable assembly for use in a welding device. More specifically, the present invention relates to a torch head and cable assembly having an improved seal between the back cap and torch head, a space-efficient handle for connecting to the torch head and minimizing rotation, and a more flexible, efficient power cable.

According to a first aspect of the present invention, a torch head for use in a torch head and cable assembly is provided. A back cap seal for receiving a back cap and electrically insulating a welding torch operator is included. The back cap seal has an inner sealing wall and an outer sealing wall. Also, the torch head has a handle connector for attaching to a handle.

According to a second aspect of the present invention, a torch head and cable assembly for a welding device is provided. The assembly includes a back cap having a hollow body, a connecting end, and a sealed end. A torch head with an insert and an overmolded body is also included. The overmolded body preferably has a back cap seal and a handle connector. The back cap seal has inner and outer sealing walls for creating two sealing surfaces with the back cap. A handle is coupled to the handle connector on the torch body and a power cable extends axially through the handle and releasably connects to the torch head.

In a third aspect of the present invention, a friction fit handle is provided having a hollow body and first and second ends. The first end preferably is an angled aperture for forming an anti-rotational friction-fit connection with a torch body. The first end also preferably includes a polarized friction fit connector so that the handle and torch head mate in a predetermined orientation and minimizes rotation. The second end provides a lip and groove for improving the connection between the handle and a cable cover.

According to another aspect of the present invention, a power cable is provided having a first fitting assembly and a second fitting assembly. A hollow hose connects the first and second fitting assemblies. At least two wires are positioned inside the hose and extend axially between the first and second fitting assemblies for improving heat dissipation.

BRIEF DESCRIPTION OF THE DRAWINGS

FIG. 1 is an exploded view of a presently preferred embodiment of a torch head and cable assembly of the present invention FIG. 2 is a fragmentary side view of the torch head and back cap shown in FIG. 1.

FIG. 3 is a magnified detail view of the area inside line 3—3 of FIG. 2.

FIG. 4 is a top view of the torch head shown in FIG. 1.

FIG. 5 is an end view of the torch head shown in FIG. 1.

FIG. 6 is a perspective view of the handle used in the torch head and cable assembly shown in FIG. 1.

FIG. 7 is a cross-sectional view of the handle taken along line 7—7 of FIG. 6.

FIG. 8 is a cross-sectional view of a preferred embodiment of the handle shown in FIG. 6 housing the power, gas and coolant cables used in a TIG welding application.

FIG. 9 is a cutaway side view of a power cable for use in the invention shown in FIG. 1.

FIG. 10 is a cross section of the power cable taken along line 10—10 of FIG. 9.

DETAILED DESCRIPTION OF THE PRESENTLY PREFERRED EMBODIMENTS

A preferred embodiment of the torch head and cable assembly 10 of the present invention is shown in FIG. 1. The torch head and cable assembly 10 is made up of a back cap 12, a torch head 14, a handle 16, a cable set 18 and a cable cover 20. Assembled, the torch head and cable assembly 10 connects to a power supply, water coolant circulator, and shielding gas supply via the water 22, gas 24, and power 26 cables of the cable set 18. The power supply, water coolant circulator and shielding gas supply may be any of a number of devices commonly used and known in the art. A welding torch operator typically holds the assembly 10 by the handle 16 or torch head 14. The operator brings the nozzle 29 and tungsten electrode to a desired distance from the electrically grounded workpiece when welding.

As shown in FIGS. 1 and 2, the torch head 14 preferably has a conductive insert assembly 28 inside an overmolded body 30. The insert may be made out of conductive metals such as copper, brass or steel. The insert assembly 28 includes a threaded portion 32 and power 34, coolant 36, and gas 38 connectors. An electrode 39 is held in place by a collet positioned in a collet body (not shown) threaded into the threaded portion 32 of the insert assembly. The back cap 12 connects to the threaded portion 32 of the insert assembly 28. The nozzle 29 threads into the collet body and an insulator 31 is positioned between the nozzle 29 and torch head 14. A glass-filled teflon material is preferably used for the insulator 31.

The overmolded body 30, preferably constructed of a silicone rubber material, includes a back cap seal 40 and a handle connector 42. The seal 40 has an inner sealing wall 44 and an outer sealing wall 46. In one preferred embodiment, the inner and outer sealing walls 44, 46 are parallel and form a groove 50. The threaded portion 32 of the insert assembly 28 is axially aligned with the axis of the inner and outer sealing walls 44, 46.

The back cap 12 connects to the threaded portion 32 and seal 40 of the torch head 14. The back cap 12 has a hollow body 52 connecting a connecting end 54 and a sealed end 56. The connecting end is preferably a threaded connector made from a material such as brass. A protruding rim 58 surrounds the connector 54 and is sized to fit in the groove 50 between the inner and outer walls 44, 46 of the seal 40. The hollow body 52 and sealed end 56 of the back cap 12 are preferably made from a glass filled phenolic plastic that is molded around the threaded brass connector.

The back cap 12 covers a rear portion of the electrode protruding from torch head 14. The electrode 39, such as a tungsten electrode used in tungsten inert gas (TIG) arc welding, extends up through the hollow body 52 towards the sealed end 56 of the back cap 20. The threaded brass connector 54 of the back cap 12 releasably connects to the threaded portion 32 of the torch head 14. An 0-ring 60 on the connector 54 helps keep shielding gas from escaping through the connection. The back cap seal 40 surrounds the connection made by the threaded brass connector and threaded surface thus providing electrical insulation and protection from gas leakage.

FIGS. 3 and 4 best show a preferred embodiment of the back cap seal 40. The inner sealing wall 44 has an inner diameter 62 and an outer diameter 64. The outer sealing wall 46 also-has an inner diameter 66 and an outer diameter 68. In a preferred embodiment, the back cap 12 and the inner and outer sealing walls 44, 46 are smooth and sized to frictionally fit together. When the threaded brass connector in the back cap 12 is connected to the threaded portion 32 of the insert 28 in the torch head 14, the back cap seal 40 forms two sealing surfaces. One sealing surface is formed between the outside of the back cap 12 and the inner diameter 66 of the outer sealing wall 46. A second sealing surface is created between the inside of the protruding rim 58 on the back cap 12 and the outer diameter 64 of the inner sealing wall 44. The preferably smooth surfaces of the seal 40 and of the connecting end 54 on the back cap combine to provide two layers of insulation between the electrode and the operator's hand. When assembled, the smooth surfaces are held together by the friction of the materials against each other. The back cap seal 40 is preferably integrally formed in the overmolded body 30.

The presently preferred back cap seal 40 provides two main advantages. First, a welding torch operator receives extra protection from stray high frequency electrical energy by having two sealing surfaces around the back cap rather than one. High frequency electrical energy is used to aid in ionizing the shielding gas to form the arc necessary to begin welding. The high frequency energy on the electrode will seek the lowest impedance path to ground. If the back cap seal is poor or worn down, the operator's hand or arm may appear as the lowest impedance path. The sealing surfaces created by the back cap seal provide extra electrical insulation.

Second, the seal better prevents the escape of the inert shielding gas, typically an Argon or Argon-Helium gas, used in the TIG welding process. Although TIG welding uses a non-consumable tungsten electrode, the tip of the electrode may erode due to contamination or an operator may wish to adjust the extension of the electrode. The back cap seal 40 is designed to cooperate with the back cap 12 to allow for simple removal or adjustment of the back cap. With use, the connection or the 0-ring 60 may become damaged and allow shielding gas to leak. The danger of electrical shock to the operator increases because leaking shielding gas requires less energy than air to ionize. The two sealing surfaces of the back cap seal add an extra layer of protection against leakage.

Referring again to FIGS. 1 and 2, the overmolded body 30 also has a handle connector 42. The handle connector 42 preferably comprises a friction fit connector for coupling with the handle 16. The friction fit connector is designed to compress and grip the inside of the handle and preferably includes at least one silicone rubber rib 70 on the end of the connector. In one preferred embodiment, the handle connector 42 also has an angled edge 72 which mates with an angled aperture 74 on the handle 16. The thickness of the angled edge 72 is preferably substantially equal to the thickness of the handle 16 so that the handle is flush with the torch head 14 when they are connected. The handle connector 42, as best shown in FIG. 5, is a polarized friction fit connector having a D-shaped cross-section in one preferred embodiment. The handle connector 42 is preferably integrally formed in the overmolded body 30.

A preferred embodiment of the handle 16 is illustrated in FIG. 6. The handle 16 has a first end 76 and a second end 78 connected by a hollow body 80. The inner diameter of the handle is preferably smaller than the outer diameter of the ribs 70 on the handle connector 42 of the torch head such that the handle connector firmly and frictionally grips the inside of the handle when the handle is connected to the torch head 14. The handle may be constructed from a plastic material, such as a phenolic plastic. In one preferred embodiment, the handle is 0.060 inches thick and made of a plastic having a dielectric value of approximately 500 Volts per 0.001 inch.

The handle 16, as best shown in FIGS. 6–8, has a curved bottom side 82 and a flat top side 84 forming a D-shaped cross-section. The D-shaped cross-section of the first end 76 is designed to fit over the complementary D-shaped cross-section on the handle connector 42. The first end 76 of the handle and the handle connector mate together to form a polarized joint in a predetermined orientation. The first end 76 of the handle may also have an angled aperture 74 designed to cooperate With the angled edge 72 on the handle connector 42. In one preferred embodiment, the angled aperture on the handle is at a 20° angle from perpendicular such that the flat top side 84 of the handle extends slightly more than the curved bottom side 82 at the end of the handle.

The D-shape cross-section of the handle 16 and handle connector 42 allows for a better ergonomic fit and a better gripping surface for the hand of the welding torch operator. The D-shape cross-section also reduces the wasted space associated with round handles. The handle 16 covers the cable set 18 and the power, coolant and gas connectors of the torch head 14 (FIG. 1). Water cooled TIG welding devices use three different cables which form a modified triangular cross-section when bundled together as shown in FIG. 8. Because the cables are arranged in the generally triangular shape, a round handle wastes excess space available inside the handle.

As shown in FIG. 8, wasted space is reduced with the preferred modified cross-section of the handle 16. By using a D-shaped cross-section for the handle, the handle takes up less space than a circular cross-section handle for the same size cable. Alternatively, the preferred D-shaped cross-section permits a larger power cable to be used in approximately the same amount of space occupied by a round cross-section handle. Larger power cables are desirable for their increased amperage carrying capacity and the resulting greater operating range of the torch head and cable assembly.

In addition to the advantages of reduced wasted space and improved ergonomics, the D-shaped handle connector and handle create a polarized joint when attached. The polarized joint prevents rotation of the torch head 14 in the hand of an operator while operating a welding device. The anti-rotational nature of the handle and handle connector design reduces the slipping problems of round friction-fit or threaded handles. Additionally, assembly of the torch head and cable assembly is simplified by the polarized joint. Furthermore, the angled aperture 74, in cooperation with the angled edge 72 on the handle connector, provides added anti-rotational and polarizing effect to the connection.

In another preferred embodiment, the handle may not have an angled aperture. It should be understood that other angular configurations may be used with the handle of the present invention. Furthermore, other shapes, such as polygons, may be used to form a polarized or anti-rotational connection. Although the torch head and cable assembly described relates to water cooled or air cooled welding torches, a presently preferred embodiment of the handle may be used in other welding applications such as gas metal arc welding (GMAW)(commonly known as MIG), plasma, shielded metal arc welding (SMAW), and STICK.

The second end 78 of the handle preferably has a lip 86 adjacent to a groove 88. The lip 86 and groove 88 are designed to receive a cable cover fastener 90. The cable cover fastener 90, preferably a plastic or metal tie wrap, may be used in the groove to secure a cable cover 20 (FIG. 1) over the cable set 18 extending from the second end 78 of the handle 16. The lip 86 and groove 88 cooperate with the fastener 90 to minimize the likelihood of the protective cable cover 20 separating from the handle. The cables are kept clean and protected from tangles and abrasions by the cable cover. A flexible material formed into a tube or sheath may be used for the cable cover in a preferred embodiment.

As best shown in FIGS. 9 and 10, an improved power cable 26 for use with a welding device is shown. The power cable 26 has a first fitting assembly 92, a second fitting assembly 94 and a hollow hose 96 connecting the first and second fitting assemblies. The hollow hose 96 may be water impermeable for water-cooled uses or may be air-tight for air-cooled uses. The fittings 92, 94 are preferably any of a number of known fittings commonly used in the art. Inside the hollow hose are at least two wires 98 positioned on the interior and extending axially between the first and second fitting assemblies 92, 94. The wires 98 are preferably pinched together at each end of the hose by crimps 100 that connect to the fittings. When assembled in the preferred torch head and cable assembly 10, the cable 26 extends axially through the handle 16 and connects to the power connector 34 on torch head 14.

In a water-cooled TIG welding application, water flows through the hose 96 and around the wires. The water takes away the heat generated by the current flowing through the wires of the power cable. By utilizing two or more parallel wires in the power cable, heat is more efficiently dissipated due to the greater wire surface area for heat to dissipate from. Preferably, the heat dissipation efficiency is increased by about 20 percent with the present invention.

In a preferred embodiment, the wires are preferably two AWG #12 wires. Two AWG #12 wires have a combined cross-sectional area approximately equal to a larger AWG #8 wire. The preferred embodiment of the power cable using at least two wires, however, dissipates heat about 20 percent more efficiently than the larger single wire. Also, the parallel electrical connection of the two wires reduces electrical resistance. The improvement in heat dissipation capability increases the amperage rating for the entire torch head and cable assembly. Flexibility is also increased by the use of multiple wires rather than one thick wire. Although the power cable may have a slightly greater circumference with two or more wires rather than one, the space efficient handle described above allows this power cable to be used in the torch head and cable assembly without any significant change in handle size. Accordingly, the handle and the power cable combine to supply electric current to the torch head in a more efficient manner.

The presently preferred multi-wire power cable may be used with all standard water-cooled or air-cooled welding torches. The length of the power cable is typically 12 or 25 feet. The fitting assemblies used on the ends of the power cable are standard and known in the art. In a preferred embodiment, the cable uses 12 gauge wire and each wire can carry 250 amps of current to the torch head 14. The combination of the improved power cable, space efficient as well as anti-rotational handle, and protective seal provide a safer, manageable and more versatile torch head and cable assembly.

From the foregoing, an improved torch head and cable assembly has been described. The improved seal on the overmolded body of the torch head is designed to increase electrical insulation and avoid gas leakages. The handle shape and the connection between the handle and the torch head minimizes rotation and optimizes the use of space for the cables. The power cable described has at least two wires for improving heat dissipation and flexibility.

It is intended that the foregoing detailed description be regarded as illustrative rather than limiting, and that it be understood that it is the following claims, including all equivalents, that define the scope of the invention.

We claim:

1. A torch head for a TIG welding device comprising:
   a back cap seal for receiving a back cap and electrically insulating a welding torch operator;
   said back cap seal having an inner sealing wall and an outer sealing wall, wherein said inner sealing wall forms a first sealing surface with the back cap and said outer sealing wall forms a second sealing surface with the back cap; and
   a handle connector for connecting the torch head to a handle.

2. The invention of claim 1 wherein the inner and outer sealing walls are parallel and form a groove.

3. The invention of claim 2 wherein the torch head further comprises an insert assembly and an overmolded body, said back cap seal and said handle connector integrally molded in said overmolded body.

4. The invention of claim 3 wherein the overmolded body is constructed of a silicone rubber material.

5. The invention of claim 2 wherein the inner sealing wall has an inner diameter and an outer diameter, the outer sealing wall has an inner diameter and an outer diameter, and said back cap has a protruding rim designed to frictionally fit in the groove between said inner and outer sealing walls.

6. The invention of claim 1 wherein the handle connector further comprises an angled lip for mating with an angled aperture on a handle.

7. The invention of claim 1 wherein the handle connector further comprises a friction fit coupling for frictionally coupling and gripping a handle.

8. The invention of claim 7 wherein the friction-fit coupling on the torch head comprises a polarized connector for frictionally coupling with the handle at a predetermined orientation.

9. The invention of claim 8 wherein the friction fit coupling further comprises at least one rib.

10. A torch head and cable assembly for a welding device comprising:
    a back cap for covering an electrode, said back cap having a connecting end, a sealed end, and a hollow body connecting said connecting end to said sealed end;
    a torch head having an insert and an overmolded body, said overmolded body having a back cap seal and a handle connector, said back cap seal having an inner sealing wall and an outer sealing wall, said back cap seal forming two sealing surfaces with said back cap for preventing leakage of shielding gas;
    a handle coupled to said handle connector on said torch head; and
    a power cable extending axially through said handle and releasably connecting to said torch head.

11. The invention of claim 10 wherein the handle further comprises a first end, a second end, and a hollow body connecting said first and second ends, said hollow body having a flat top side and a curved bottom side for reducing wasted space and improving an operator's gripping surface.

12. The invention of claim 11 wherein the first end of the handle comprises a D-shaped cross-section and the handle connector on the torch head comprises a complementary D-shaped cross section, said handle and said handle connector forming a polarized anti-rotational joint.

13. The invention of claim 11 wherein the handle connector further comprises an angled lip and wherein the first end of the handle comprises an angled aperture, said angled lip and said angled aperture designed to releasably connect and align the handle and the torch head in a predetermined orientation.

14. The invention of claim 10 wherein the power cable further comprises a hollow hose surrounding at least two wires, said wires extending axially along said hose.

15. The invention of claim 14 wherein the welding device comprises a water-cooled TIG torch, said hollow hose comprises a flexible, water-impermeable hose for receiving water circulated to cool the at least two wires.

16. A friction fit handle for use with a torch head and cable assembly comprising:
    a first end;
    a second end;
    a hollow body connecting said first and second ends; and
    said hollow body having a flat top side and a curved bottom side on the exterior of said handle, and a flat top side and a curved bottom side on the interior of said handle.

17. The invention of claim 16 wherein the first end comprises an angled aperture for forming an anti-rotational friction-fit connection with a handle connector on a torch head.

18. The invention of claim 16 wherein the handle is constructed from phenolic plastic.

19. The invention of claim 16 wherein the second end further comprises a lip and a groove.

20. The invention of claim 16 wherein the first end further comprises an anti-rotational cross-section.

21. The invention of claim 20 wherein said cross section is a D-shaped cross section.

22. A power cable for use in a torch head and cable assembly comprising:
    a first fitting assembly;
    a second fitting assembly;
    a hollow hose connecting said first fitting assembly to said second fitting assembly; and
    at least two wires positioned inside the hollow hose and extending axially between the first and second fitting assemblies, wherein said at least two wires are electrically connected at said first and second fitting assemblies, and wherein said at least two wires are spaced apart along substantially the length of said power cable so that a coolant may flow around the circumference of each of said at least two wires.

23. The invention of claim 22 wherein the torch head and cable assembly is water-cooled, said hollow hose further comprising a flexible water-impermeable hose for receiving water circulated to cool the at least two wires.

24. The invention of claim 22 wherein the torch head and cable assembly is air-cooled, said hollow hose further comprising a flexible air-tight hose for receiving air circulated to cool the at least two wires.

25. The invention of claim 22 wherein the at least two wires are electrically connected in parallel.

* * * * *